(No Model.)
F. J. KALDENBERG.
Toilet Mirror.
No. 229,828.                    Patented July 13, 1880.
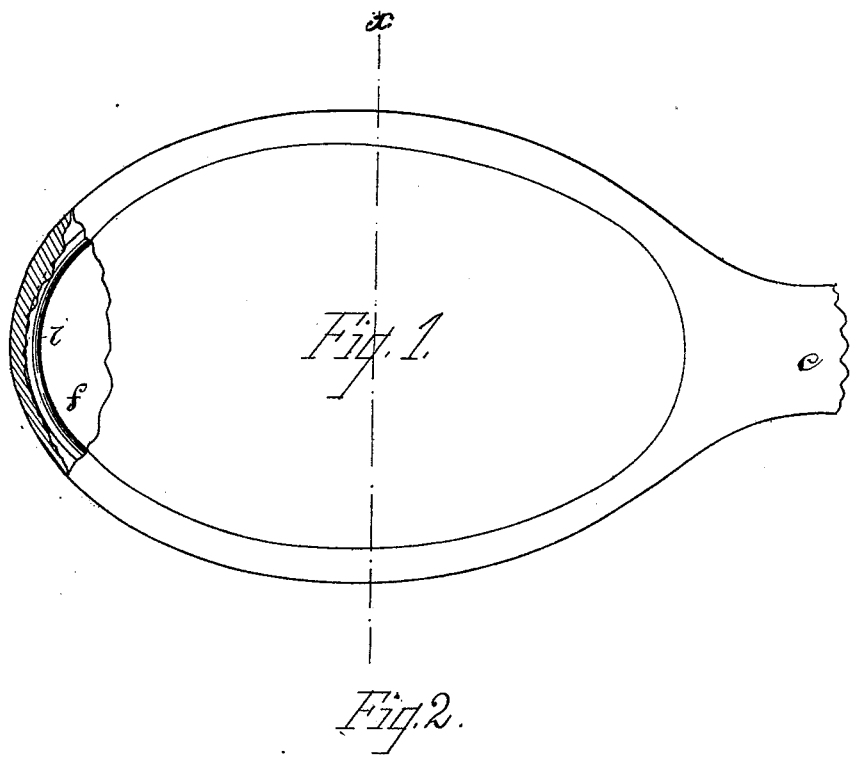
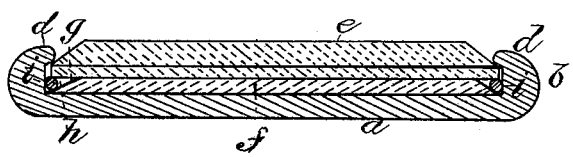
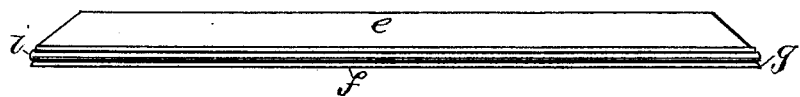
Witnesses:
Belle Sylvester.
John P. Lewis.
Inventor:
Frederick Julius Kaldenberg
By H. Newell
his attorney

United States Patent Office.

FREDERICK J. KALDENBERG, OF NEW YORK, N. Y.

TOILET-MIRROR.

SPECIFICATION forming part of Letters Patent No. 229,828, dated July 13, 1880.

Application filed May 20, 1880. (No model.)

*To all whom it may concern:*

Be it known that I, FREDERICK JULIUS KALDENBERG, of the city of New York, in the county and State of New York, have invented a certain new and useful Improvement in Toilet-Mirrors and other Similar Articles, of which the following is a full, clear, and exact description, reference being had to the drawings accompanying and forming a part of the same.

My improvement is especially designed for mirrors in which the back frame and rim are made in one piece and the glass is inserted by being sprung into it from the front and is retained therein by slight pressure; and the object of my present invention is to provide means whereby the glass can be quickly and securely adjusted in the frame and be as readily removed therefrom; also, to secure a perfect and uniform adjustment of the glass without undue pressure upon any one portion or part of the rim of the frame; and, finally, to provide a means of fastening in the glass which is applicable to the ordinary and well-known construction of ivory and composition frames, whether provided with a cavity having either the inner surface of the sides beveled or perpendicular, and in which the relative size of the glass to the cavity is the same as is now generally in use.

To attain this end my improvement consists in providing the glass with a channel or groove extending entirely around its peripheral edge, and inserting therein a cord or strip of rubber or equivalent elastic material, whereby when the glass is inserted in the frame it will be securely held therein by the uniform pressure of the elastic material on the sides of the frame.

In the accompanying drawings, Figure 1 represents a front view of a hand toilet-mirror embodying my invention, a portion of the glass and frame shown broken away. Fig. 2 is a sectional view taken on the line *x x* of Fig. 1, and Fig. 3 is a side view of the glass removed.

The frame *a*, including the rim *b* and handle *c*, is made in one piece. The rim *b* projects inwardly, forming, as it were, an overhanging lip, *d*, against which the glass impinges when adjusted in the frame. This construction is not, however, essential to my present improved mode of securing the glass, as the ordinary frames having the inner sides of the cavity slightly beveled or directly perpendicular and without an overhanging lip would be equally well adapted for the application of this improvement.

*e* is the mirror-glass, which is beveled in the usual well-known manner. To the back surface of this glass is attached, by means of elastic glue or any other suitable cement, a piece of common glass, *f*, whose exterior edge conforms in shape to that of the mirror-glass, and which is preferably of about the same dimensions. Its edge is beveled, as seen at *g* in Fig. 2, and when united to the mirror-glass forms a channel or groove, *h*, into which is inserted a cord or round piece of rubber, *i*, or other suitable elastic material.

Instead of using a supplementary piece of glass to form the groove for the reception of the elastic material, the mirror-glass itself may be grooved out in its vertical base portion for this purpose, and though this is practicable, and in some cases more desirable, and may be done without departing from the spirit of my invention, it requires more skill and involves greater labor than the beveling of the common glass, which can be done by any ordinary workman.

In the application of my present improvement the relative size of the mirror-glass and cavity in the frame is the same as that now existing where the glass is held in the frame by means of a small wire placed around the inner edge of the rim after the glass is inserted, as in that case it is always necessary, in order to protect the frame from splitting, that a small space should be left between the edge of the glass and the inner surface of the sides of the frame, to allow of the shrinkage of the ivory.

When the glass is to be inserted into the frame the cord *i* is sprung into the groove, where it is securely retained by its elasticity. One side of the glass is then pressed into the cavity, and the rubber yielding sufficiently will enable the whole glass to be sprung into place.

The elastic material projects beyond the edge of the glass sufficiently to bear against the side of the frame and permit an equal pressure upon the glass, so that it is so perfectly adjusted beneath the rim that it cannot be shaken out, but can, by a slight side pressure, be easily removed, if required.

This method of securing the glass in the frame is as applicable to round and square as to the general oval shape of hand-mirrors; and it enables the glass to be inserted after composition and ivory frames have been thoroughly seasoned, ready for the market, which has heretofore been found an impossibility in other methods of fastening in the glass now in general use.

I claim—

1. The combination, with a mirror-frame, of a mirror-glass having a beveled glass secured to the back surface thereof, and with elastic material interposed between and projecting beyond the edges of the glasses, substantially as and for the purpose set forth.

2. The combination, with the frame $a$, of the mirror-glass $e$, beveled glass $f$, and cord $h$, substantially as and for the purpose set forth.

FRED. J. KALDENBERG.

Witnesses:
G. MERRICK,
LEWIS P. WARTH.